J. R. MOFFATT.
TRIMMING MECHANISM FOR SEWING MACHINES.
APPLICATION FILED JUNE 29, 1914.

1,240,753.

Patented Sept. 18, 1917.
5 SHEETS—SHEET 1.

J. R. MOFFATT.
TRIMMING MECHANISM FOR SEWING MACHINES.
APPLICATION FILED JUNE 29, 1914.

1,240,753.

Patented Sept. 18, 1917.
5 SHEETS—SHEET 2.

J. R. MOFFATT.
TRIMMING MECHANISM FOR SEWING MACHINES.
APPLICATION FILED JUNE 29, 1914.

1,240,753.

Patented Sept. 18, 1917.
5 SHEETS—SHEET 3.

Witnesses

Inventor
James R. Moffatt
By Sturtevant & Mason
Attorneys

J. R. MOFFATT.
TRIMMING MECHANISM FOR SEWING MACHINES.
APPLICATION FILED JUNE 29, 1914.

1,240,753.

Patented Sept. 18, 1917.
5 SHEETS—SHEET 4.

Inventor
James R. Moffatt
By Sturtevant & Mason
Attorneys

Witnesses

J. R. MOFFATT.
TRIMMING MECHANISM FOR SEWING MACHINES.
APPLICATION FILED JUNE 29, 1914.
1,240,753.
Patented Sept. 18, 1917.
5 SHEETS—SHEET 5.
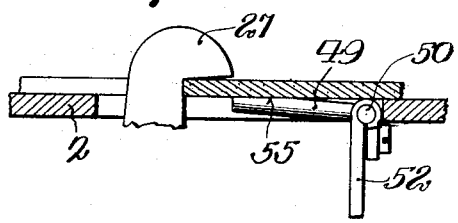
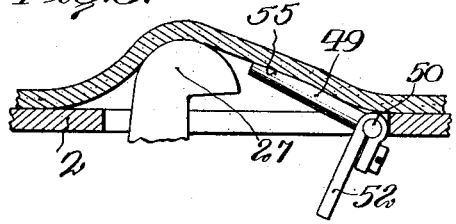
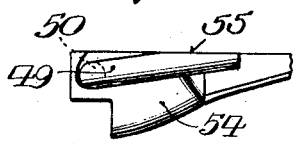
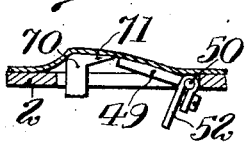
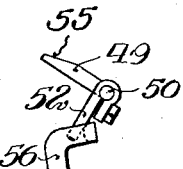
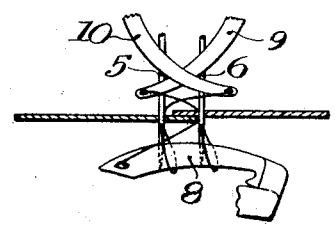
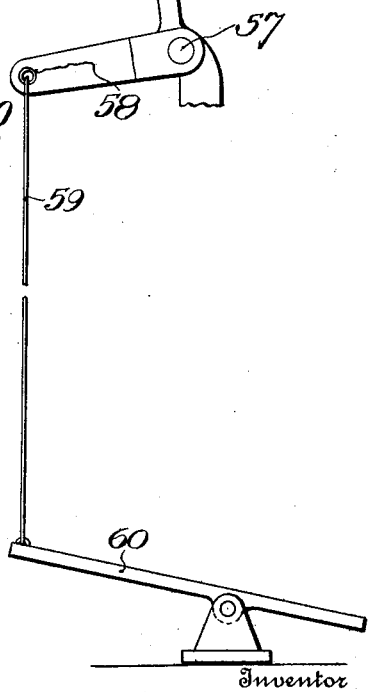

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

TRIMMING MECHANISM FOR SEWING-MACHINES.

1,240,753.   Specification of Letters Patent.   Patented Sept. 18, 1917.

Application filed June 29, 1914. Serial No. 847,947.

*To all whom it may concern:*

Be it known that I, JAMES R. MOFFATT, a citizen of the United States, residing at Chicago, in the county of Cook, State of Illinois, have invented certain new and useful Improvements in Trimming Mechanism for Sewing-Machines, of which the following is a description, reference being had to the accompanying drawing and to the figures of reference marked thereon.

This invention relates to new and useful improvements in trimming mechanism for sewing machines and more particularly to the means for rendering a trimming mechanism ineffective for trimming without stopping the stitching mechanism.

An object of the invention is to provide means which is entirely independent of the trimming mechanism and which may be controlled by a treadle for rendering the trimming mechanism ineffective or effective at the will of the operator.

A further object of the invention is to provide means of the above character which is so constructed and operated that the trimming mechanism may be rendered ineffective without stopping the stitching mechanism.

A further object of the invention is to provide means of the above character which are manually moved for rendering the trimming device ineffective and which are automatically returned to normal position for rendering the trimming device effective.

These and other objects will in part be obvious and will in part be hereinafter more fully disposed.

In the drawings which show by way of illustration one embodiment of the invention:

Fig. 7 is an enlarged view showing the upper trimming member and the controlling device therefor positioned so that the fabric is being severed.

Fig. 8 is a similar view showing the controlling device deflecting the fabric over the top of the trimming member.

Fig. 9 is a detail showing the supporting ledge for the controlling finger.

Fig. 10 is a detail showing diagrammatically on a small scale the treadle for raising the controlling finger.

Fig. 11 is a detail showing the presser foot in side elevation and the relation of the movable trimming member thereto.

Fig. 12 is a detail showing more or less diagrammatically the needles, the lower looper, the upper thread carrying loopers, and the position of the fabrics being stitched together.

Fig. 13 is a detail in section, showing a slightly modified form of movable trimmer blade with the deflecting finger raised.

Fig. 14 is a similar view, showing the deflector finger lowered and the movable trimming blade penetrating the fabric.

The invention consists, generally in providing a trimming machine which has a fixed or stationary trimming blade substantially flush with the upper surface of the work support, and a movable trimming blade which is mounted beneath the work support and projects above and overhanging said work support so that in its shearing action said movable blade cuts down on to said stationary blade.

Located in advance of the trimming mechanism is a deflecting finger which is normally spring pressed so that its upper face is substantially flush with the upper surface of the work support. This finger is connected through suitable mechanism with the treadle which may be depressed at the will of the operator for raising the finger.

The finger is preferably pivoted at its forward end and extends to a point just in advance of the movable trimming blade. When the treadle is depressed the finger is raised so that it inclines upwardly from the front end to the rear and the rear end of the finger is above the path of travel of the cutting edge of the cutting blade so that the material will be raised by said finger and deflected over the top of said movable blade. This controlling finger may be shifted by the operator without stopping the stitching mechanism to render the trimming mechanism ineffective, and when released by the operator will be automatically returned to normal position.

Figure 1:
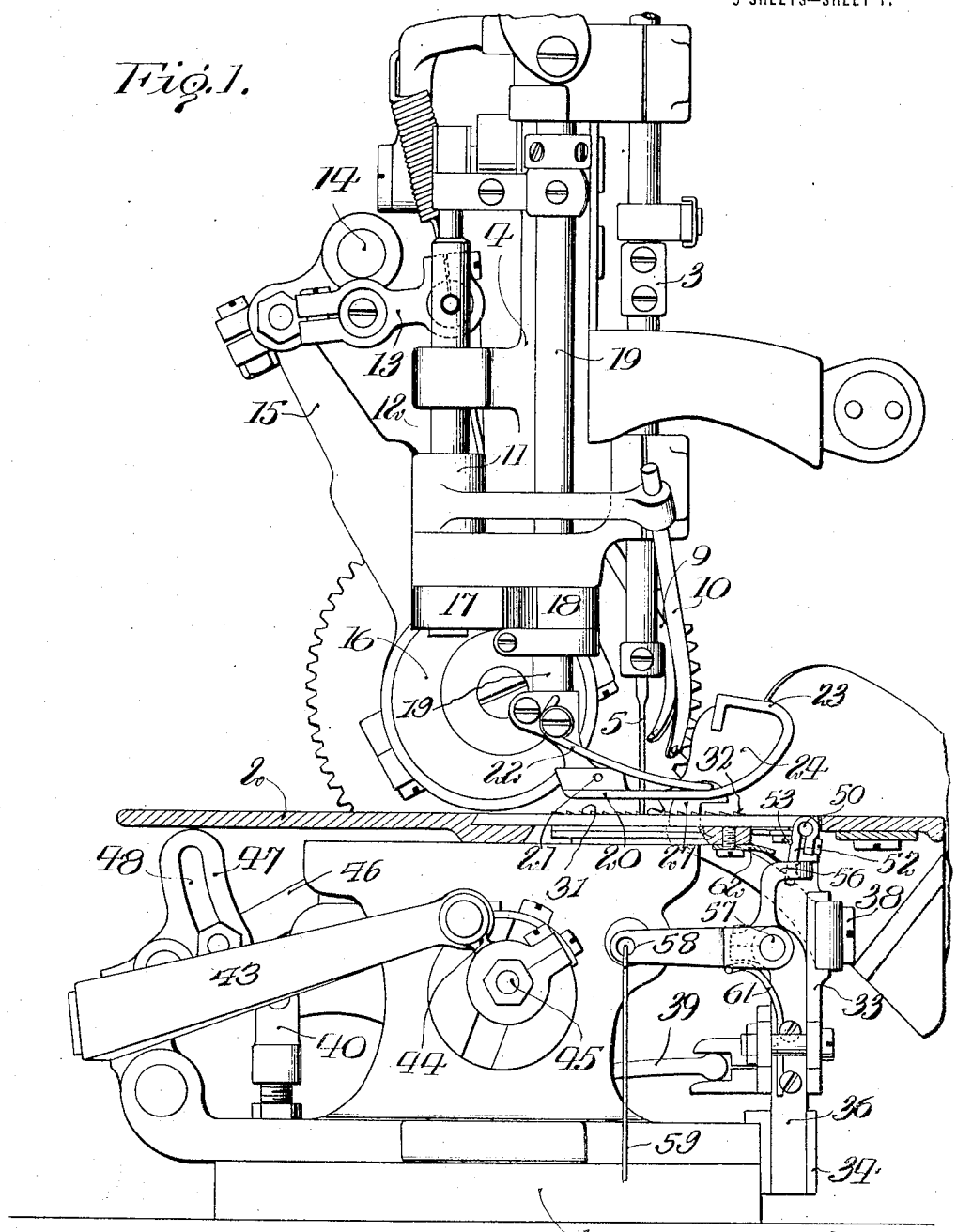
Figure 1 is a view partly in end elevation and partly in section showing a trimming machine with the improved means for controlling the trimming mechanism applied thereto.
Figure 2:
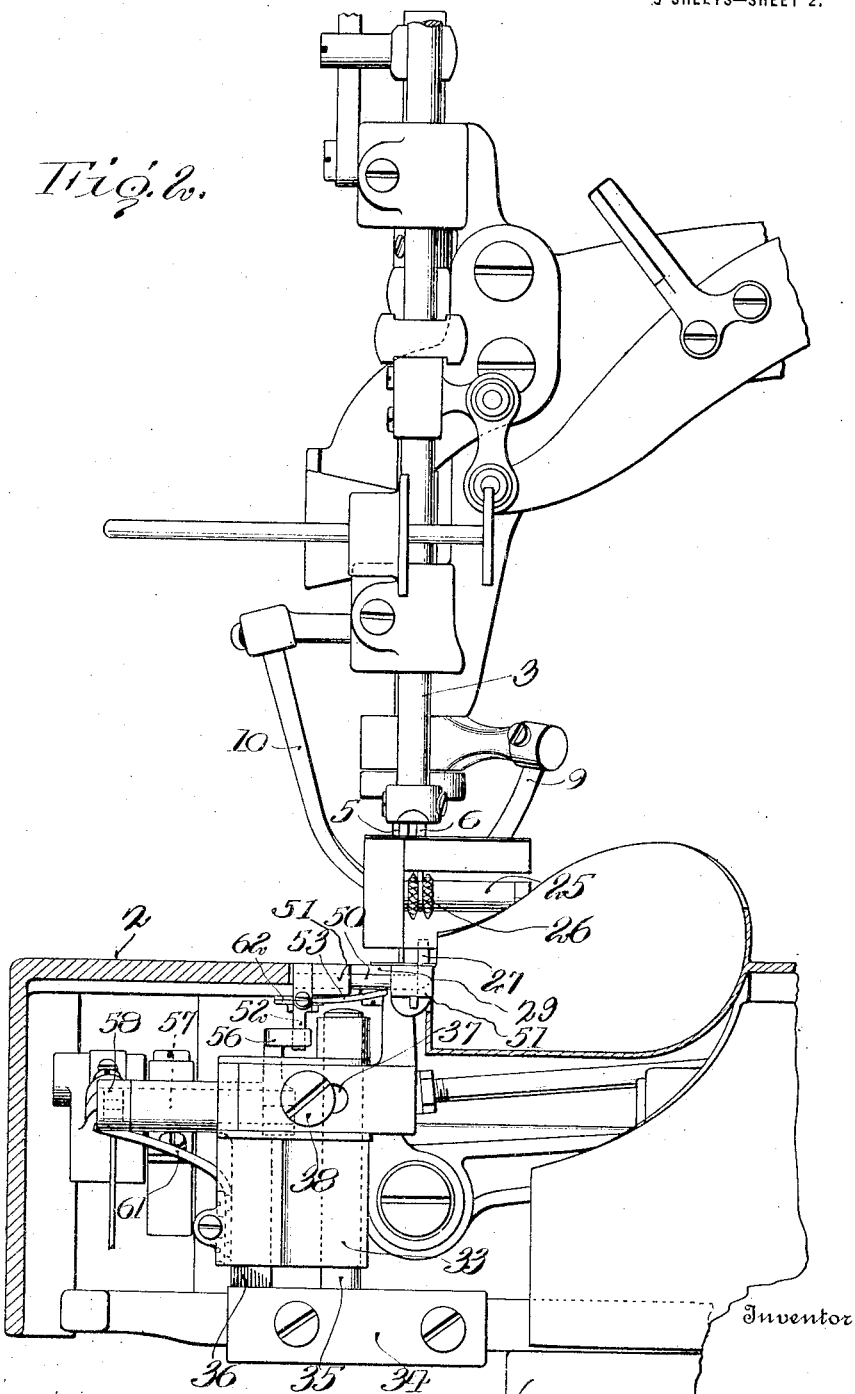
Fig. 2 is a view partly in side elevation and partly in section from the front of the machine.
Figure 3:
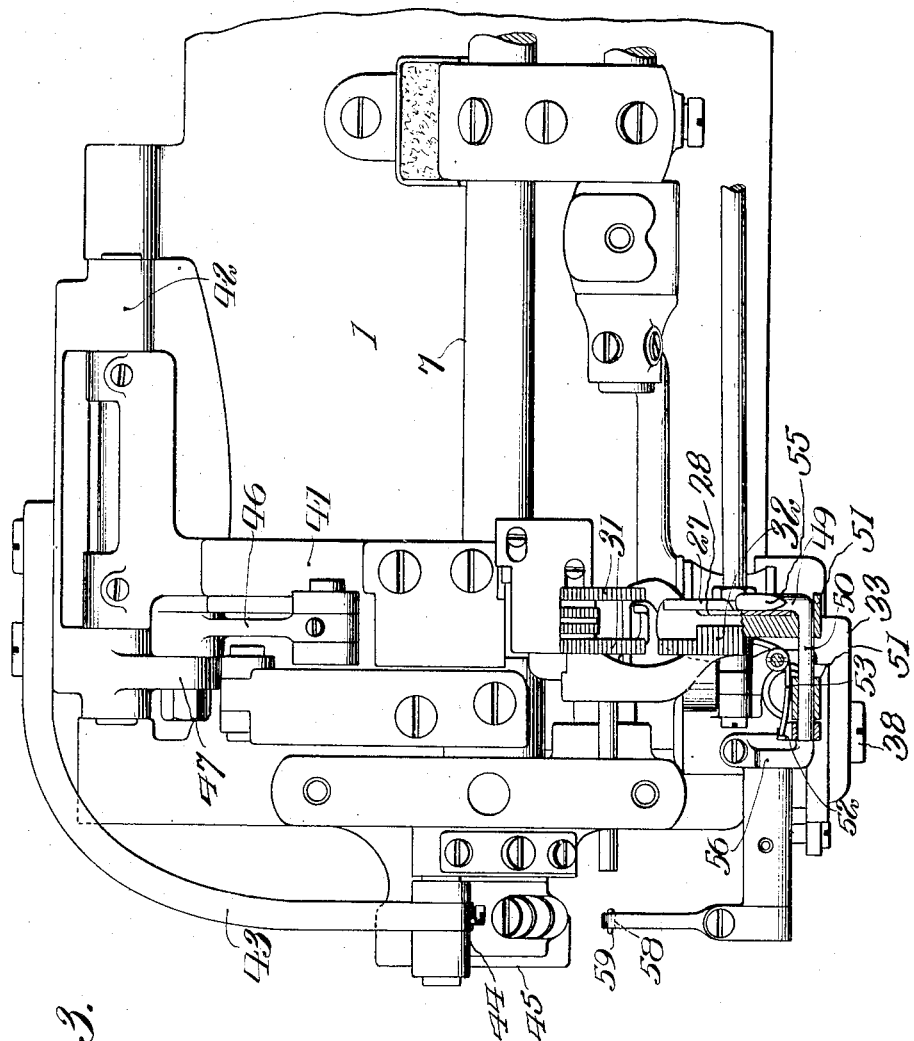
Fig. 3 is a top plan view of the parts at the forward end of the machine beneath the work support.

Referring more in detail to the drawings, the machine embodying the invention consists of a bed plate 1 on which is mounted a work support 2. A needle bar 3 reciprocates in the forward end of an overhanging arm 4, and as herein shown is provided with a plurality of needles 5 and 6, see Fig. 2. The needle bar is reciprocated in the usual manner from the driving shaft 7 which is journaled in bearings beneath the work support. Coöperating with the needles 5 and 6 beneath the work support is a thread carrying looper 8 which coöperates with both needles and forms a connecting line of loops between the two needle threads. Coöperating with the needles 5 and 6 above the work support are two thread laying loopers 9 and 10. The thread laying looper 10 is carried by a collar 11 mounted on a vertical shaft 12 which is oscillated by a link 13 connected to an arm on a shaft 14 which in turn is oscillated by an eccentric strap 15 coöperating with an eccentric 16. At the lower end of the shaft 12 is a segment 17 which engages a gear on a collar 18 which supports the arm 9.

The collar 18 oscillates about the presser bar 19 which carries a presser foot 20 at the lower end. These thread laying fingers 9 and 10 oscillate back and forth in front of the needles and form loops which are stitched down by the needle threads and thus form connecting threads between the lines of stitching.

From the above description, it will be apparent, therefore, that the needles form lines of stitching which are connected both above and below the material. The presser foot 20 is pivotally connected to its supporting shank at 21 and a spring 22 normally presses the forward end of the shank downwardly, holding the same yieldingly in a horizontal position. The forward end of the foot is bent upwardly and backwardly, as at 23. A vertical plate 24 is located along side of the forwardly projecting portion and closes the space formed by the bent back portion 23. The other side of the presser foot is formed with an extension which terminates short of the projecting portion 23, and a guiding roller 25 is pivotally mounted at the forward end of this laterally projecting portion. This roller 25 is formed with fabric engaging teeth 26. The guiding wall 24 is located so that a strip or edging may be guided over the roll 25 with its edge in contact with the guiding wall 24 and said edge will be directed between the two needles 5 and 6.

Figure 4:
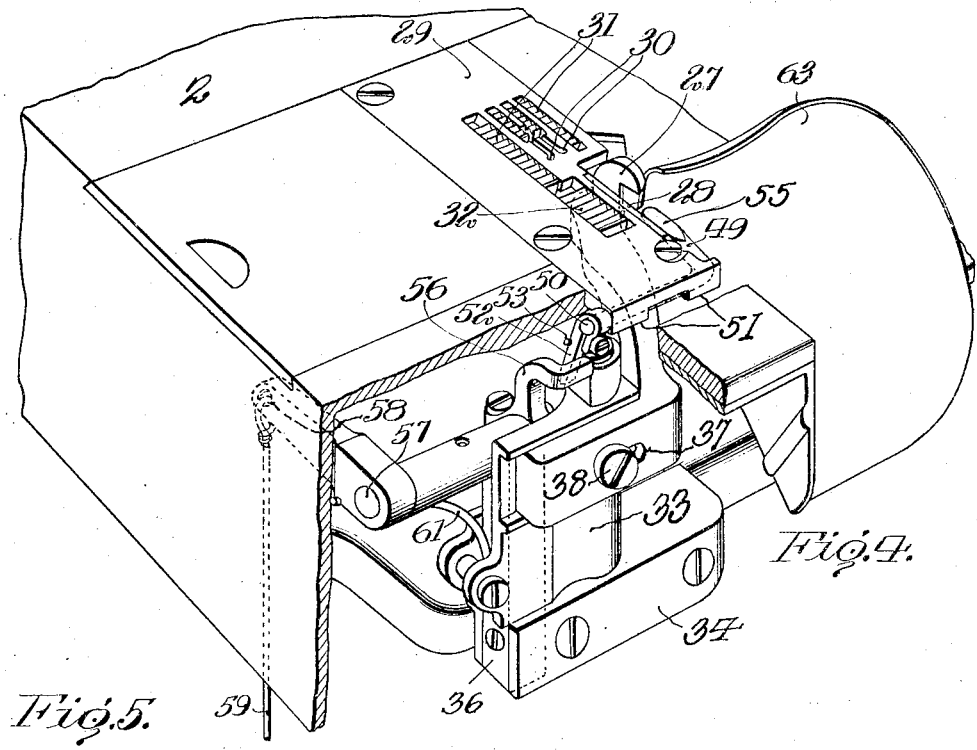
Fig. 4 is a perspective view showing a portion of the trimming mechanism and the controlling devices therefor.

The body fabric to which the edging is to be attached has its edge trimmed and prepared by a trimming device which includes an overhanging movable trimming blade 27. This movable trimming blade coöperates with a fixed trimming blade 28, see Fig. 4. This fixed trimming blade 28 is set in a recess in the throat plate 29 so that the upper edge thereof is substantially flush with the upper surface of the throat plate. Said throat plate is also provided with needle openings 30 and with feed slots through which project feed dogs 31 and 32.

The movable trimming blade 27 is carried by a vertical reciprocating slide 33 which moves up and down on a bracket 34 attached to the bed plate of the machine. Said bracket is provided with a vertical post 35 on which the slide 33 reciprocates. The slide is held from turning on the post by a second guiding post 36, which is also attached to the bracket 34. The movable trimming blade 27 is formed with a slot 37, and a screw 38 passing through said slot adjustably secures said blade to said reciprocating slide. The slide is moved up and down on its bracket by a lever 39 which is fulcrumed on a post 40 and engages an eccentric on the main shaft 7.

The feed dog 31 is mounted on a bar 41 which is connected to a feed rocker 42 at its rear end, and this feed rocker is oscillated by an arm 43 which is connected through a link 44 to a crank 45 on the forward end of the shaft 7. The feed dog 32 is connected to an auxiliary feed bar which is slidingly supported on the main feed bar, and these two feed bars are moved up and down simultaneously by an eccentric on the main shaft 7. The auxiliary feed bar is moved back and forth by a link 46 which is connected to a slotted bracket 47 attached to the feed rocker. The link may be shifted in the slot 48 in said bracket and the throw of the auxiliary feed dog relative to the main feed dog varied.

Located directly in front of the movable trimming blade 27 is a controlling finger 49. The throat plate is cut away to form a recess for this finger. Said finger is carried by a supporting shaft 50. The throat plate is formed with depending lugs 51 on its lower face at the forward end thereof and the shaft 50 supporting the finger is journaled in these lugs. An arm 52 is adjustably attached to the other end of the shaft.

Figure 5:
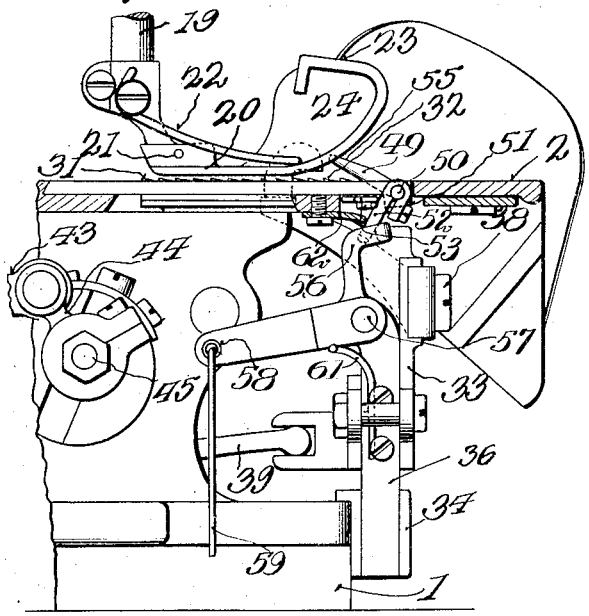
Fig. 5 is a detail sectional view along the line of feed showing the controlling device moved to position for rendering the trimming mechanism ineffective.
Figure 6:
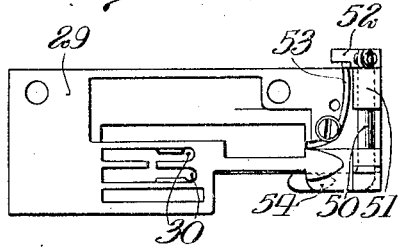
Fig. 6 is a detail showing a bottom plan view of the throat plate.

A spring 53 attached to the lower face of the work support engages this arm 52 and normally presses the same toward the front of the machine, as viewed in Fig. 5, and this depresses the arm 49 so that said arm normally rests on a supporting ledge 54 therefor, which ledge is formed integral with the throat plate. When in this position, the upper face 55 of the arm 49 at the forward end thereof is substantially flush with the upper surface of the throat plate. The arm 52 projects into the path of a lever 56. This lever is pivoted at 57 to the bracket which supports the reciprocating slide for the movable trimming blade. The other end of the lever extends toward the rear of the machine and is formed with an opening 58 adapted to receive a link 59 which is connected to a treadle 60. A spring 61 engages the lever so as to raise the forward end of the treadle and the projecting arm of the lever and move said lever out of engagement with the arm 52 of the controlling finger and this permits the spring 53 to return the finger to its normal position which is substantially flush with the throat plate.

A stop 62 is attached to the under surface of the work support and lies in the path of movement of the arm 52 and serves to limit the movement thereof when the treadle is depressed. The forward end of the controlling finger 49 is located just in advance of the forward end of the movable trimming blade 27. When the treadle is depressed, this controlling finger is moved to the position shown in Figs. 5 and 8. When the treadle is released, the springs above referred to will automatically restore the finger to the position shown in the other figures of the drawings, that is, with the upper face substantially flush with the upper surface of the throat plate.

The movable trimming blade 27, as above noted, has a forwardly projecting cutting portion which overhangs the work support and when the blade is moved downwardly underneath said overhanging portion the fabric extending underneath said overhanging portion will be cut. The upper surface of the blade 27 is preferably rounded, as indicated in the drawings. During the normal operation of the machine, the fabric passes over the controlling finger 49 and extends underneath the overhanging part of the trimming blade 27 and the trimming blade performs its normal cutting operation. The trimmed off strip engages the deflector 63 and is deflected away from the stitching mechanism.

When it is desired to stitch an edging to a body fabric and prepare the edge of the body fabric, the edging is directed over the guiding roll 25 which is so positioned relative to the trimming blade 27 that the edging is led underneath the presser foot in rear of the cutting blade and, therefore, is not operated upon by said blade. The inner edge of the edging passes between the needles. The body fabric is led to the stitching mechanism so that the projecting raw edge will pass underneath the overhanging part of the trimming blade 27 which will trim the edge, and this trimming blade is located directly in front of the stitching mechanism and so disposed relative thereto that the trimmed edge will pass between the needles. Therefore, the edge of the body fabric which is trimmed and the inner edge of the edging which is attached to the fabric will be joined for the reason that one of the needles will enter one of the parts while the other enters the other part and the looper threads joining the lines of stitching will unite the two parts.

There are times when it is desired to render the trimming mechanism ineffective and it is often desired to do this without stopping the stitching mechanism. The operator by depressing the treadle will raise the controlling finger 49 which in turn will raise the edge of the material being trimmed so as to cause the same to pass over the top of the movable cutting blade 27. In other words, when the controlling finger is raised by the treadle its upper face is inclined rearwardly and the material passing along the finger on the upper face thereof will be directed over the top of the trimming member. This renders the trimming member ineffective, although said member may continue to vibrate. Upon releasing the treadle the controlling finger 49 will at once return to its normal position.

One use to which the machine may be put, is the stitching of a lace edging around the arm hole of a garment. When the operation is nearly completed, the trimmer is rendered ineffective, which causes the goods to pass over the top of the trimmer and permits the edging to be stitched entirely around the arm hole.

My improved deflector may be used in connection with a trimmer having a penetrating point. Figs. 13 and 14 show a construction of this character. In Fig. 13 the movable trimmer blade is indicated at 70, and this movable trimming blade has a penetrating point 71. The deflector is the same as shown and described in the other figures of the drawings, and consists of the pivoted finger 49 pivoted at 50 so the same may be swung to cause the material to pass over the top of the trimmer blade. When this deflector 49 is lowered, the penetrating point will engage the material, pass through it and begin its trimming operation. Such a construction permits the trimmer to be rendered effective without stopping the stitching mechanism.

It is obvious that minor changes in the details of construction and arrangement of parts may be made, without departing from the spirit of the invention as set forth in the appended claims.

Having thus described my invention, what I claim as new and desire to secure by Letters Patent is:

1. A trimming mechanism for sewing machines including in combination a work support, a movable trimming blade mounted beneath the work support and having a cut edge overhanging the work support, a device located in front of said trimming blade for deflecting the material over the top of said trimming blade for rendering the same ineffective, and a treadle connected to said device for moving the same in one direction.

2. A trimming mechanism for sewing machines including in combination a work support, a movable trimming blade mounted beneath the work support and having a forwardly projecting portion overhanging the work support, a pivoted finger located in front of said movable trimming blade, said finger being normally flush with the work support, and means for raising the end of the finger adjacent said trimming blade for deflecting the material over said trimming blade, said means for raising the finger including a treadle for moving the finger in one direction, and a spring for returning the finger to normal position flush with the top of the work support.

3. A trimming mechanism for sewing machines including in combination a movable trimming blade mounted beneath the work support, and projecting above the same, said blade having a forwardly projecting portion with a cutting edge at the lower side thereof, a pivoted finger located directly in front of said trimming blade and adapted to be raised so as to deflect the material over the top of said trimming blade, a spring for normally holding said finger in a position flush with the work support, a seating shoulder for said finger when in normal position, and means for raising the finger at the will of the operator.

4. A trimming mechanism for sewing machines including in combination a movable trimming blade mounted beneath the work support, and projecting above the same, said blade having a forwardly projecting portion with a cutting edge at the lower side thereof, a pivoted finger located directly in front of said trimming blade and adapted to be raised so as to deflect the material over the top of said trimming blade, a spring for normally holding said finger in a position flush with the work support, a seating shoulder for said finger when in normal position, and means for raising the finger at the will of the operator, said means for raising the finger including a treadle and a stop for limiting the upward movement of the finger.

5. The combination of a work support, stitch forming mechanism trimming members located in advance of the stitch forming mechanism and including a movable trimming blade mounted beneath the work support and projecting above the same, said movable trimming blade having a forwardly projecting portion with the cutting edge on the lower side thereof, and means for rendering said cutting blade ineffective at the will of the operator including a controlling finger pivoted to the work support and normally lying substantially flush therewith, a seating shoulder on which said controlling finger rests, a spring for pressing said finger into contact with its seating shoulder, a treadle for raising the rear end of said finger, and a stop for limiting the movement of said finger.

6. A sewing machine including in combination a work support, spaced needles, a looper coöperating with said needles beneath the work support, thread laying loopers coöperating with said needles above the work support, a trimming mechanism including trimming members located in advance of the needles and so disposed that the cutting line extends between the needles, said trimming members including a trimming blade mounted beneath the work support and projecting above the same, said trimming blade having a forwardly projecting portion having a cutting edge at the lower side thereof, means for guiding an edging to the stitch forming mechanism in rear of the trimming members, the inner edge thereof passing between the needles, means for rendering the trimming mechanism ineffective at the will of the operator without stopping the stitching mechanism, said last named means including a controlling finger pivoted to the work support in advance of the movable trimming blade, and a treadle for shifting said finger so as to cause the material to pass over the top of the movable trimming blade.

7. In a sewing machine, a work support, a movable trimming blade overhanging said support, a stationary blade mounted on said support and coöperating with said movable blade, a member pivotally mounted at its front end in advance of said blades for deflecting the material over said blades to render the latter ineffective, and treadle-controlled means for actuating said pivoted member.

8. In a sewing machine, a work support, a movable trimming blade overhanging said support, a stationary blade mounted on said support and coöperating with said movable blade, a member pivotally mounted at its front end in advance of said blades for deflecting the material over said blades to render the latter ineffective, treadle-controlled means for actuating said pivoted member, and automatic means for returning said member to its initial position when released by the operator.

In testimony whereof, I affix my signature, in the presence of two witnesses.

JAMES R. MOFFATT.

Witnesses:
S. R. McNEIL,
C. RATNER.

Copies of this patent may be obtained for five cents each, by addressing the "Commissioner of Patents, Washington, D. C."